(12) United States Patent
Liu

(10) Patent No.: US 12,585,868 B2
(45) Date of Patent: Mar. 24, 2026

(54) SYSTEM TO TRACE CHANGES IN A CONFIGURATION OF A SERVICE ORDER CODE FOR SERVICE FEATURES OF A TELECOMMUNICATIONS NETWORK

(71) Applicant: T-Mobile USA, Inc., Bellevue, WA (US)

(72) Inventor: James Chungyu Liu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 174 days.

(21) Appl. No.: 18/531,393

(22) Filed: Dec. 6, 2023

(65) Prior Publication Data

US 2025/0190692 A1 Jun. 12, 2025

(51) Int. Cl.
*G06F 40/18* (2020.01)
*G06F 40/103* (2020.01)
*G06F 40/137* (2020.01)

(52) U.S. Cl.
CPC ............ *G06F 40/18* (2020.01); *G06F 40/103* (2020.01); *G06F 40/137* (2020.01)

(58) Field of Classification Search
CPC ....... G06F 40/18; G06F 40/103; G06F 40/137
See application file for complete search history.

(56) References Cited

U.S. PATENT DOCUMENTS

| | | | |
|---|---|---|---|
| 5,541,986 A | | 7/1996 | Hou |
| 6,085,171 A | * | 7/2000 | Leonard .............. H04L 41/5061 |
| | | | 705/26.81 |

| | | | |
|---|---|---|---|
| 6,137,873 A | | 10/2000 | Gilles |
| 7,099,868 B1 | | 8/2006 | Turba et al. |
| 7,617,479 B2 | | 11/2009 | Hambrick et al. |
| 7,769,153 B1 | | 8/2010 | Mcdougal et al. |
| 7,778,719 B2 | | 8/2010 | Chen et al. |
| 7,941,333 B2 | | 5/2011 | Mcdougal et al. |
| 8,139,742 B2 | | 3/2012 | Klos et al. |
| 8,484,071 B1 | * | 7/2013 | Lybrook ............ G06Q 30/0282 |
| | | | 705/7.36 |
| 9,183,068 B1 | | 11/2015 | Shum et al. |
| 9,519,699 B1 | * | 12/2016 | Kulkarni ............... G06F 16/951 |
| 9,753,701 B2 | | 9/2017 | Liu |

(Continued)

FOREIGN PATENT DOCUMENTS

| | | | | |
|---|---|---|---|---|
| CN | 110347985 B | | 7/2023 | |
| EP | 1643450 B1 | * | 2/2012 | ........... G06F 3/0482 |

(Continued)

OTHER PUBLICATIONS

Saragih et al. "Implementation of telecommunications cross-industry collaboration through agile project management" (2021) (https://pmc.ncbi.nlm.nih.gov/articles/PMC8141899/) (Year: 2021).*

*Primary Examiner* — Sujay Koneru

(74) *Attorney, Agent, or Firm* — Perkins Coie LLP

(57) ABSTRACT

A method for linking information associated with changes in a Service Order Code (SOC) configuration of a telecommunications service provider, comprising initiating a computer script that receives a user input, querying a Build Document (BD), retrieving an SOC configuration, linking changes in the SOC configuration, and presenting the result in a color-coded table format or in a hierarchical tree format.

20 Claims, 5 Drawing Sheets

(56)                References Cited

U.S. PATENT DOCUMENTS

| | | | |
|---|---|---|---|
| 9,767,441 B2 | 9/2017 | Eleid et al. | |
| 10,289,994 B2 | 5/2019 | Gilbey et al. | |
| 12,073,481 B1* | 8/2024 | Paterson | H04L 67/52 |
| 2002/0054081 A1 | 5/2002 | Mimoun | |
| 2004/0111284 A1* | 6/2004 | Uijttenbroek | G06Q 10/10 |
| | | | 705/52 |
| 2005/0022069 A1 | 1/2005 | Firman | |
| 2005/0080664 A1 | 4/2005 | Marr | |
| 2006/0095342 A1 | 5/2006 | Pilu et al. | |
| 2008/0140688 A1* | 6/2008 | Clayton | G06Q 10/0637 |
| 2008/0154631 A1* | 6/2008 | Greenstein | G06Q 30/02 |
| | | | 705/1.1 |
| 2008/0244594 A1* | 10/2008 | Chen | G06F 8/34 |
| | | | 718/104 |
| 2010/0153322 A1* | 6/2010 | Mandelbaum | H04L 41/082 |
| | | | 706/14 |
| 2010/0234009 A1* | 9/2010 | Antani | H04L 67/306 |
| | | | 455/419 |
| 2011/0078487 A1* | 3/2011 | Nielsen | G06Q 30/0251 |
| | | | 707/E17.108 |
| 2011/0099502 A1* | 4/2011 | Kim | G06F 16/955 |
| | | | 715/810 |
| 2011/0179110 A1* | 7/2011 | Soloway | G06Q 10/0633 |
| | | | 709/203 |
| 2011/0250865 A1* | 10/2011 | Breitzman | H04M 15/765 |
| | | | 455/406 |
| 2011/0271282 A1* | 11/2011 | Sutter, IV | G06F 9/5027 |
| | | | 718/101 |
| 2012/0046999 A1* | 2/2012 | Jayaraman | G06Q 10/06393 |
| | | | 705/7.39 |
| 2014/0006061 A1* | 1/2014 | Watanabe | G06Q 40/08 |
| | | | 705/4 |
| 2018/0167356 A1* | 6/2018 | Tullberg | H04L 67/51 |
| 2020/0143925 A1* | 5/2020 | King | G16H 20/10 |
| 2022/0232130 A1* | 7/2022 | Kauffman | H04W 4/24 |
| 2022/0385676 A1 | 12/2022 | Chen Kaidi | |
| 2023/0008460 A1* | 1/2023 | Mungo | G07C 5/0891 |
| 2024/0420194 A1* | 12/2024 | Livingston | G06N 5/04 |

FOREIGN PATENT DOCUMENTS

| | | |
|---|---|---|
| EP | 3298746 B1 | 10/2021 |
| WO | 2012071037 A2 | 5/2012 |
| WO | 2013029187 A1 | 3/2013 |
| WO | 2019153514 A1 | 8/2019 |

* cited by examiner

100

112-4

104-6

114-9

104-4

114-8

114-10

116

106

102-3

114-6

110-2

104-7

114-1

104-2

114-7

102-1

110-3

112-1

116-2

102-2

114-2

104-1

112-2

110-1

114-4

102-4

114-5

104-5

110-1

114-3

104-3

112-3

116-1

300a

302a

302b

304

306

300b 308   310   312   314   316   318   320

400

Start

402

Display graphical user interface and accept SOC as user input

404

Initiate computer script by passing SOC entered by user

406

Query Build Documents

408

Link changes in SOC configuration and present results

End

500

SYSTEM TO TRACE CHANGES IN A CONFIGURATION OF A SERVICE ORDER CODE FOR SERVICE FEATURES OF A TELECOMMUNICATIONS NETWORK

BACKGROUND

A Service Order is a document that states the service that a client requires. It shows the deliverables of a service provider to its client. Usually short term, the document covers the onetime services ordered. Additionally, it can include cost estimates, schedule, location, and resources relevant to the service's implementation. Service providers utilize Service Orders to have a record of their work. Aside from that, Service Orders play a significant role when service providers plan their resources, especially their allocation of equipment, utilities, and workforce. A Service Order includes guidelines that govern the location and structure of data within it. The Service Order format collects and structures all the information needed for service activation, including ordering, provisioning, maintenance, and billing. It includes guidelines that govern the location and structure of the data, with expert assistance on custom enhancements if needed. Many service providers model their Customer Service Records (CSRs) using the Service Order format. A Service Order Code (SOC) is a unique, short, and easy way to refer to a particular type of Service Order.

BRIEF DESCRIPTION OF THE DRAWINGS

Detailed descriptions of implementations of the present invention will be described and explained through the use of the accompanying drawings.

Figure 1:
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system for compiling chronological information about features and sub-features of a service provider's rate plans by querying disparate systems and documents and presenting it in a standardized, hyperlinked, user-friendly format. A service provider of a telecommunications network offers its subscribers a variety of service products. Each service product offering comprises at least one service feature for which the subscriber is charged a periodic bill. One service feature can include one or more individual sub-features. For example, an unlimited domestic calling and texting feature includes the sub-features of unlimited domestic calling and unlimited domestic texting. Another service feature can be, for example, a limited amount of data usage allocation. For ease of identification and tracking within the service provider's billing system, each service feature and sub-feature is assigned a unique Service Order Code (SOC). The service provider may also offer service discounts to its subscribers, with each discount also assigned an SOC.

The service provider may offer various rate plan products to its subscribers, wherein each rate plan is built using at least one SOC. In one implementation, a service product offered by the service provider comprises at least one rate plan SOC with a Monthly Recurring Charge (MRC). Optionally, the service product may also include a basic data feature SOC, a data feature buy-up SOC, a discount SOC, an optional feature add-on SOC with its own MRC, or some combination of the preceding SOCs. Each service product offer is constructed by specifying the product requirements in an Offer Requirement Document (ORD). The product is then built using a Build Document (BD) that contains each feature SOC, discount SOC, and tax SOC to be included in the product. The final product is then loaded into service provider's billing systems and Policy Control Function (PCF) in the provider's 5G core network.

The service provider may, over time, pursuant to changes in business plans or in response to changes in market conditions, offer new rate plans or service products to its subscribers by modifying the configuration of an existing SOC, copy the configuration of one SOC into another SOC, or otherwise build and rebuild an SOC to change the service feature offered to subscribers.

The present invention comprises a user interface coupled with a python script. A user enters an SOC into the interface to initiate the script, which queries every BD associated with that SOC. The query results are presented in the user interface in a table form listing the queried SOC's build history and depicting the hierarchy of each feature and sub-feature associated with the SOC in the form family tree.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
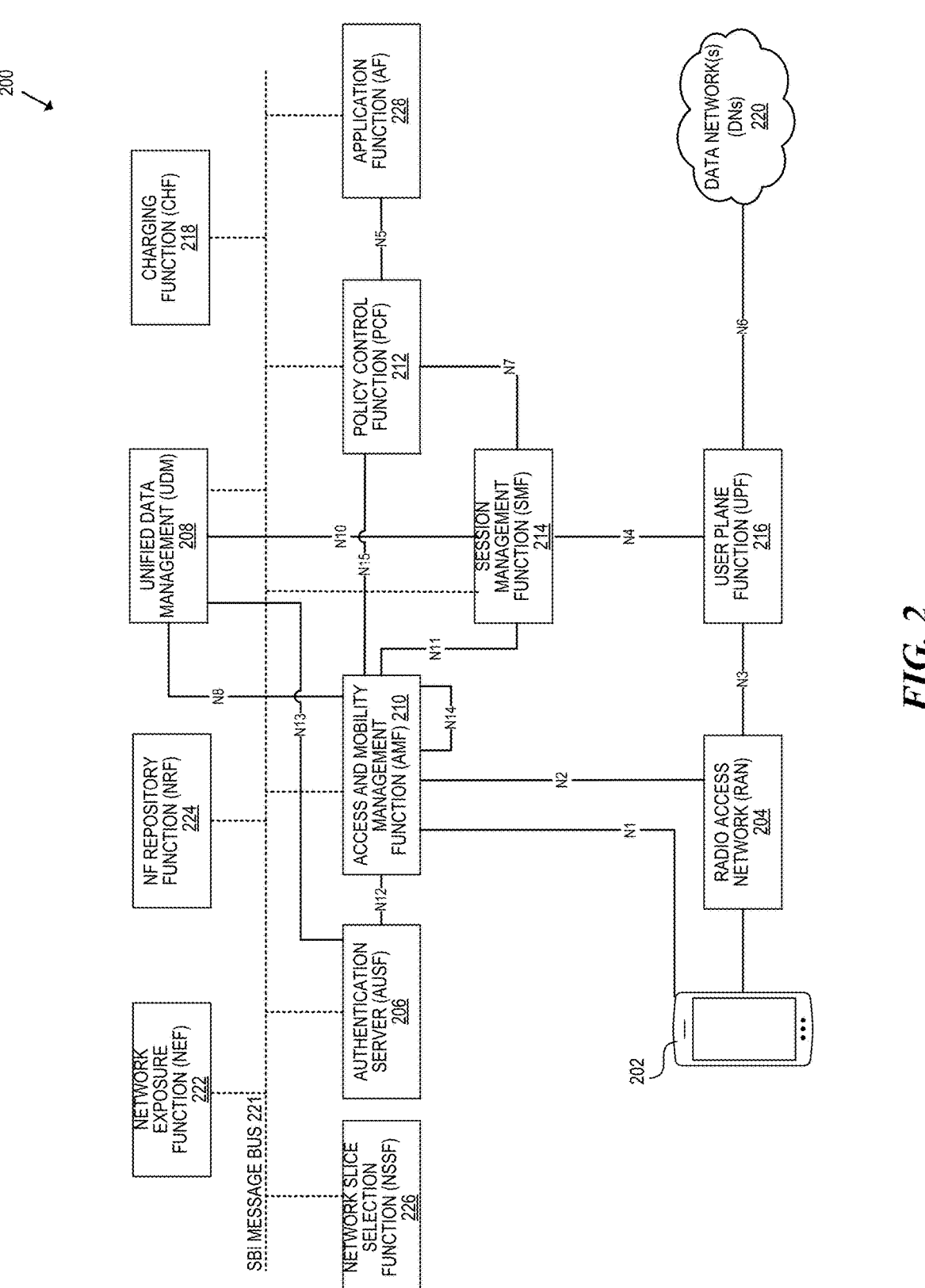
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFS include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

System to Trace Changes in Configuration of a Service Order Code

Figure 3A:
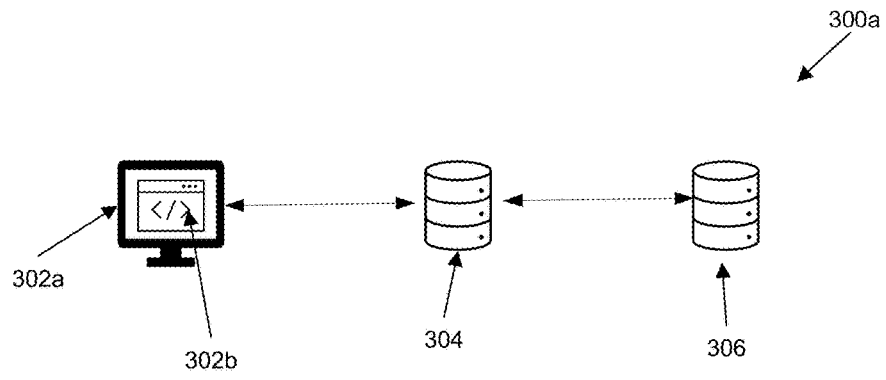
FIG. 3A is a block diagram of a system that can implement aspects of the present technology.
Figure 3B:
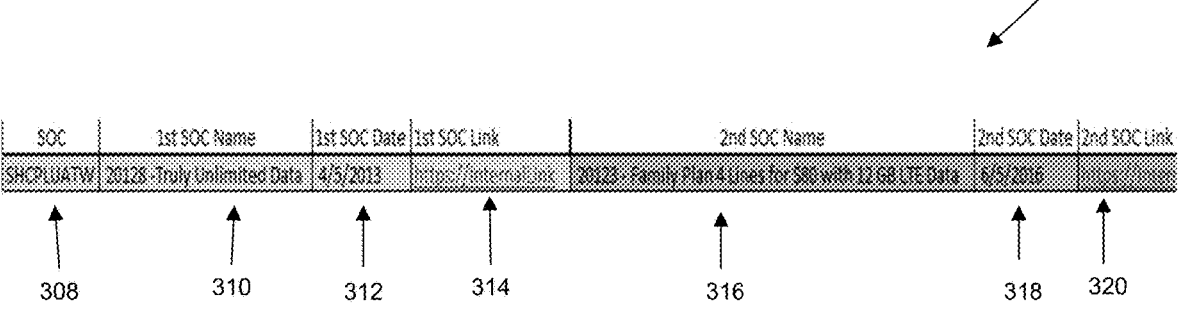
FIG. 3B is an example of the result produced by the present technology.

FIG. 3A is a block diagram of a system that can implement aspects of the present technology. FIG. 3B is an example of the results produced by the present technology. The system 300a in which aspects of the present technology are implemented can be configured to produce the results 300b. As shown, the results can be presented in a table format. In one implementation, the system 300a includes a computer monitor 302a, which displays a graphical user interface 302b. A computer operator enters a desired Service Order Code (SOC) into the graphical user interface 302b. The user SOC entered by the operator is passed on to a computer script initiated on a non-transitory, computer-readable storage medium 304. The computer script queries at least one Build Document (BD) stored on a second non-transitory, computer-readable storage medium 306, retrieves the results, and presents them in a table or hierarchical tree format on the computer monitor 302a. In one implementation, the computer monitor 302a, the first non-transitory, computer-readable storage medium 304, and the second non-transitory, computer-readable storage medium 306 can be combined into a single unit. In another implementation, each or any of these components of the system may be separate from the others.

The results 300b produced by the computer script can be presented in a table format. The table format can include at least one row and at least one column. In one implementation, one column 308 in the table can contain the SOC entered by the user. Another column 310 can contain a name associated with the SOC. Another column 312 can contain a date when the SOC was created in the system. Another column 314 can contain a hyperlink to a non-transitory, computer-readable storage medium 306 where the BD associated with the SOC can be found. Another column 316 can contain a second SOC name associated with the SOC. A yet another column 318 can contain a date when the second SOC was created in the system. Another column 320 can contain a hyperlink to a non-transitory, computer-readable storage medium 306 where the BD associated with the SOC can be found. In one implementation, at least one column can be color-coded to make the information easier to read or to show a special relationship between two columns.

Figure 4:
FIG. 4 is a flowchart of a system that can implement aspects of the present technology.
Figure 4:
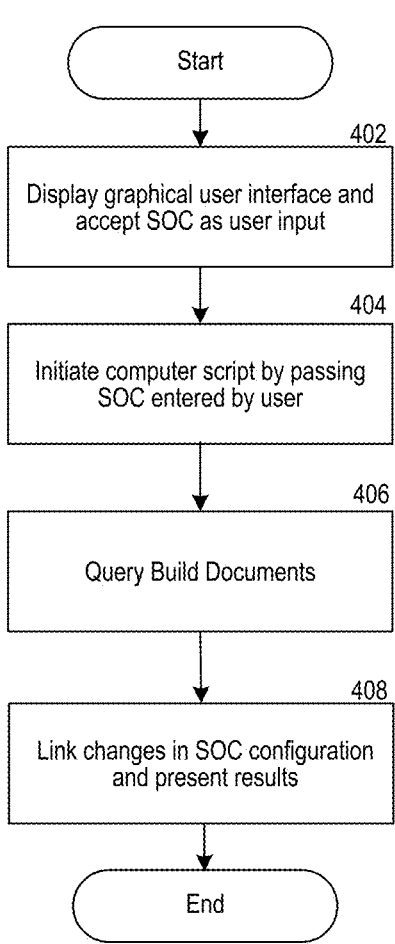

FIG. 4 is a flowchart of a method to implement aspects of the present technology. The process 400 is performed by a system of a telecommunications network, which includes a computer monitor capable of displaying a graphical user interface, at least one hardware processor, and a first non-transitory memory storing instructions thereon. The instructions, when executed, can link information associated with changes in a configuration of a Service Order Code (SOC) of a service provider of the telecommunications network.

At 402, the system can cause a display of a graphical user interface on a computer monitor. The graphical user interface is configured to accept at least one SOC as user input. An SOC is a unique code associated with a rate plan, a service feature, or a service sub-feature offered by the service provider.

At 404, the system can initiate at least one computer script stored in a first non-transitory, computer-readable storage medium by passing the user input as an input to the computer script. At 406, the computer script can be configured to query at least one Build Document (BD) stored on a second non-transitory, computer-readable medium and retrieve a configuration of the SOC. A BD is a document containing at least one SOC representing at least one service feature offered by the service provider. Each change in a configuration of the SOC causes a change in at least one service feature provided to a subscriber of the telecommunications network.

At 408, the script can link changes in the configuration of the SOC, including a link from a current configuration of the SOC to a prior configuration of the SOC, and can cause presentation of the results on the computer monitor. In one implementation, the system can cause the results of the computer script to be presented on the computer monitor in a table format. At least one row in the table can represent the SOC entered by the user as input in the graphical user interface, and at least one column in the table can represent a chronological name of the SOC. At least one column in the table can represent at least one service feature associated with the SOC. In another implementation, the system can cause the computer script to color-code, using a single color, the at least one column representing a chronological name of the SOC and the at least one column representing the at least one service feature. In another implementation, the system can cause the script to present the results in a table format such that at least one column in the table contains metadata associated with an SOC or a service feature. The metadata can include a date when the SOC was created, a version identifier of the SOC, a version identifier of the BD, a uniform resource locator (URL) linking to the BD, or any combination of thereof. In yet another implementation, the system can cause the computer script to present results in a hierarchical family tree format. The hierarchical family tree format can further include at least one hierarchical level corresponding to at least one SOC and each level can correspond to a version of the at least one SOC.

Computer System

Figure 5:
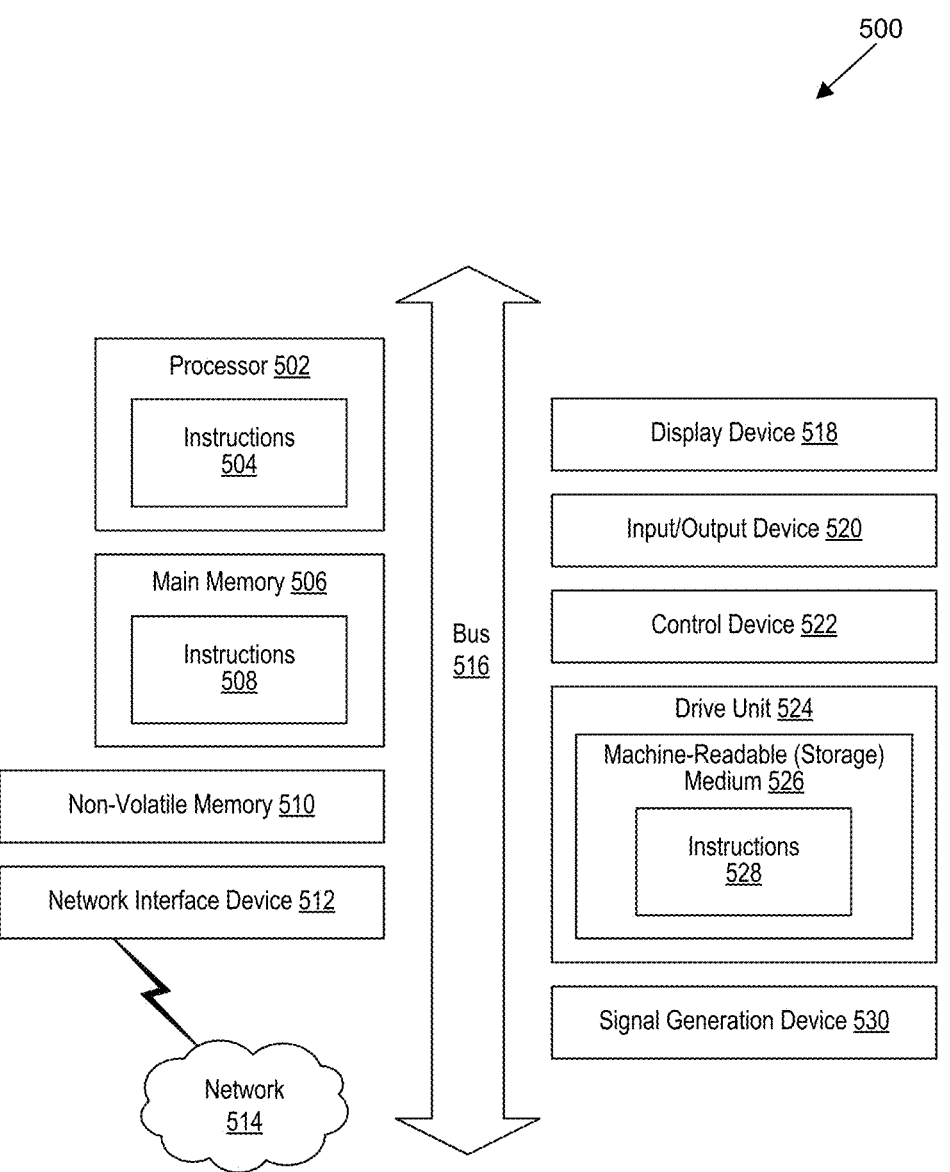
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SoC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method for linking information associated with changes in a configuration of a Service Order Code (SOC) of a service provider of a telecommunications network, the method comprising:

receiving a new SOC as a user input on a graphical user interface on a computer monitor,
    wherein an SOC is a unique code to build a rate plan, data plan, texting plan, or calling plan offered by the service provider,
    wherein the new SOC is associated with a subscriber device subscribed to the telecommunications network, and
    wherein the subscriber device is connected to a remotely located network node of the telecommunication network;
querying at least two Build Documents (BDs) based on the new SOC using at least one computer script stored in a first non-transitory, computer-readable storage medium,
    wherein the new SOC is inputted into the at least one computer script,
    wherein at least one BD of the at least two BDs is stored on a second non-transitory, computer-readable medium, and
    wherein a BD is a document containing at least one SOC representing at least one service feature offered by the service provider;

retrieving, using the at least one computer script, a current configuration of the new SOC inputted by the user and a prior configuration of the new SOC inputted by the user,
    wherein the current configuration and the prior configuration are stored on different BDs,
    wherein a difference between the current configuration and the prior configuration is caused by a change in the rate plan, data plan, texting plan, or calling plan provided to a subscriber of the telecommunications network;
determining that the prior configuration is associated with the current configuration based on information associated with changes between the current configuration and the prior configuration;
generating a link between the current configuration and the prior configuration;
generating a first digital link to a first BD stored on the first non-transitory, computer-readable storage medium that includes the current configuration and a second digital link to a second BD stored on the second non-transitory, computer-readable storage medium that includes the prior configuration; and
disabling or enabling access of the subscriber device to a texting feature, data feature, or calling feature of the base station based on the new SOC and the link between the current configuration and the prior configuration.

2. The method of claim 1, wherein causing presentation of the result of the at least one computer script on the computer monitor comprises:

presenting the result of the computer script in a table format on the computer monitor,
    wherein the table format includes at least two columns,
    wherein at least one row in the table format represents the SOC,
    wherein at least a first column in the table represents a chronological name of the SOC, and
    wherein at least a second column in the table represents at least one service feature associated with the SOC.

3. The method of claim 2, wherein presenting the result of the computer script in the table format on the computer monitor comprises:

color-coding, using a single color, the at least first column representing a chronological name of the SOC and the at least second column representing the at least one service feature.

4. The method of claim 2, wherein presenting the result of the computer script in the table format on the computer monitor comprises:

presenting the result of the computer script in a table format on the computer monitor,
    wherein at least one column in the table contains metadata associated with an SOC or a service feature.

5. The method of claim 2, wherein presenting the result of the computer script in the table format on the computer monitor comprises:

presenting the result of the computer script in a table format on the computer monitor,
    wherein at least one column in the table contains metadata associated with an SOC or a service feature, and
    wherein the metadata includes a date the SOC was created, a version identifier of the SOC, a version identifier of the BD, a uniform resource locator (URL) linking to the BD, or any combination of thereof.

6. The method of claim 1, wherein causing presentation of the result of the at least one computer script on the computer monitor comprises:

presenting the result of the computer script in a hierarchical family tree format, and wherein the hierarchical family tree format comprises at least one hierarchical level corresponding to at least one SOC.

7. The method of claim 1, wherein causing presentation of the result of the at least one computer script on the computer monitor comprises:

presenting the result of the computer script in a hierarchical format including multiple levels for at least one SOC, wherein each level corresponds to a version of the at least one SOC.

8. A system of a telecommunications network for linking information associated with changes in a configuration of a Service Order Code (SOC) of a service provider of the telecommunications network, the system comprising:

a computer monitor capable of displaying a graphical user interface;

at least one hardware processor; and a first non-transitory, computer-readable storage medium storing instructions thereon, which, when executed by the at least one hardware processor, cause the system to:

receive a new SOC as a user input on a graphical user interface on a computer monitor, wherein an SOC is a unique code to build a rate plan, data plan, texting plan, or calling plan offered by the service provider, wherein the new SOC is associated with a subscriber device subscribed to the telecommunications network, and wherein the subscriber device is connected to a remotely located network node of the telecommunication network;

query at least two Build Documents (BDs) based on the new SOC using at least one computer script stored in a first non-transitory, computer-readable storage medium, wherein the new SOC is inputted into the at least one computer script, wherein at least one BD of the at least two BDs is stored on a second non-transitory, computer-readable medium, and wherein a BD is a document containing at least one SOC representing at least one service feature offered by the service provider;

retrieve, using the at least one computer script, a current configuration of the new SOC inputted by the user and a prior configuration of the new SOC inputted by the user, wherein the current configuration and the prior configuration are stored on different BDS, wherein a difference between the current configuration and the prior configuration is caused by a change in the rate plan, data plan, texting plan, or calling plan provided to a subscriber of the telecommunications network;

determine that the prior configuration is associated with the current configuration based on information associated with changes between the current configuration and the prior configuration;

generate a link between the current configuration and the prior configuration;

generate a first digital link to a first BD stored on the first non-transitory, computer-readable storage medium that includes the current configuration and a second digital link to a second BD stored on the second non-transitory, computer-readable storage medium that includes the prior configuration; and disable or enable access of the subscriber device to a texting feature, data feature, or calling feature of the base station based on the new SOC and the link between the current configuration and the prior configuration.

9. The system of claim 8, wherein causing presentation of the result of the at least one computer script on the computer monitor further comprises causing the system to:

present the result of the computer script in a table format on the computer monitor, wherein the table format includes at least two columns, wherein at least one row in the table format represents the SOC, wherein at least a first column in the table represents a chronological name of the SOC, and wherein at least a second column in the table represents at least one service feature associated with the SOC.

10. The system of claim 9, wherein causing presentation of the result of the computer script in a table format on the computer monitor comprises causing the system to:

color-code, using a single color, the at least first column representing a chronological name of the SOC and the at least second column representing the at least one service feature.

11. The system of claim 9, wherein causing presentation the result of the computer script in a table format on the computer monitor further comprises causing the system to:

present the result of the computer script in a table format on the computer monitor, wherein at least one column in the table contains metadata associated with an SOC or a service feature.

12. The system of claim 9, wherein causing presentation of the result of the computer script in the table format on the computer monitor further comprises causing the system to:

present the result of the computer script in a table format on the computer monitor, wherein at least one column in the table contains metadata associated with an SOC or a service feature, and wherein the metadata includes a date the SOC was created, a version identifier of the SOC, a version identifier of the BD, a uniform resource locator (URL) linking to the BD, or any combination of thereof.

13. The system of claim 8, wherein causing presentation of the result of the at least one computer script on the computer monitor comprises further causing the system to:

present the result of the computer script in a hierarchical family tree format, wherein the hierarchical family tree format comprises at least one hierarchical level corresponding to at least one SOC.

14. The system of claim 8, wherein causing presentation of the result of the at least one computer script on the computer monitor comprises further causing the system to:

present the result of the computer script in a hierarchical format including multiple levels for at least one SOC, wherein each level corresponds to a version of the at least one SOC.

15. A non-transitory, computer-readable storage medium comprising instructions recorded thereon, wherein the instructions when executed by at least one data processor of a system, cause the system to:

receive a new SOC as a user input on a graphical user interface on a computer monitor, wherein an SOC is a unique code to build a rate plan, data plan, texting plan, or calling plan offered by the service provider, wherein the new SOC is associated with a subscriber device subscribed to the telecommunications network, and wherein the subscriber device is connected to a remotely located network node of the telecommunication network;

query at least two Build Documents (BDs) based on the new SOC using at least one computer script stored in a first non-transitory, computer-readable storage medium, wherein the new SOC is inputted into the at least one computer script, wherein at least one BD of the at least two BDs is stored on a second non-transitory, computer-readable medium, and wherein a BD is a document containing at least one SOC representing at least one service feature offered by the service provider;

retrieve, using the at least one computer script, a current configuration of the new SOC inputted by the user and a prior configuration of the new SOC inputted by the user, wherein the current configuration and the prior configuration are stored on different BDs, wherein a difference between the current configuration and the prior configuration is caused by a change in the rate plan, data plan, texting plan, or calling plan provided to a subscriber of the telecommunications network;

determine that the prior configuration is associated with the current configuration based on information associated with changes between the current configuration and the prior configuration;

generate a link between the current configuration and the prior configuration;

generate a first digital link to a first BD stored on the first non-transitory, computer-readable storage medium that includes the current configuration and a second digital link to a second BD stored on the second non-transitory, computer-readable storage medium that includes the prior configuration; and disable or enable access of the subscriber device to a texting feature, data feature, or calling feature of the base station based on the new SOC and the link between the current configuration and the prior configuration.

16. The non-transitory, computer-readable storage medium of claim 15, wherein causing presentation of the result of the at least one computer script on the computer monitor further comprises causing the system to:

present the result of the computer script in a table format on the computer monitor, wherein the table format includes at least two columns, wherein at least one row in the table represents the SOC, wherein at least a first column in the table represents a chronological name of the SOC, and wherein at least a second column in the table represents at least one service feature associated with the SOC.

17. The non-transitory, computer-readable storage medium of claim 16, wherein causing presentation of the result of the computer script in a table format on the computer monitor comprises causing the system to:

color-code, using a single color, the at least first column representing a chronological name of the SOC and the at least second column representing the at least one service feature.

18. The non-transitory, computer-readable storage medium of claim 16, wherein causing presentation the result of the computer script in a table format on the computer monitor further comprises causing the system to:

present the result of the computer script in a table format on the computer monitor, wherein at least one column in the table contains metadata associated with an SOC or a service feature.

19. The non-transitory, computer-readable storage medium of claim 16, wherein causing presentation of the result of the computer script in the table format on the computer monitor further comprises causing the system to:

present the result of the computer script in a table format on the computer monitor, wherein at least one column in the table contains metadata associated with an SOC or a service feature, and wherein the metadata includes a date the SOC was created, a version identifier of the SOC, a version identifier of the BD, a uniform resource locator (URL) linking to the BD, or any combination of thereof.

20. The non-transitory, computer-readable storage medium of claim 15, wherein causing presentation of the result of the at least one computer script on the computer monitor comprises further causing the system to:

present the result of the computer script in a hierarchical family tree format, wherein the hierarchical family tree format comprises at least one hierarchical level corresponding to at least one SOC, and wherein each level corresponds to a version of the at least one SOC.

* * * * *